(No Model.)

2 Sheets—Sheet 1.

W. O. NOYES.
STONE AND POTATO FORK.

No. 310,958. Patented Jan. 20, 1885.

Witnesses:
F. M. Burnham
William Hay Knox

Inventor:
William O. Noyes
By Chas. B. Tilden
Atty.

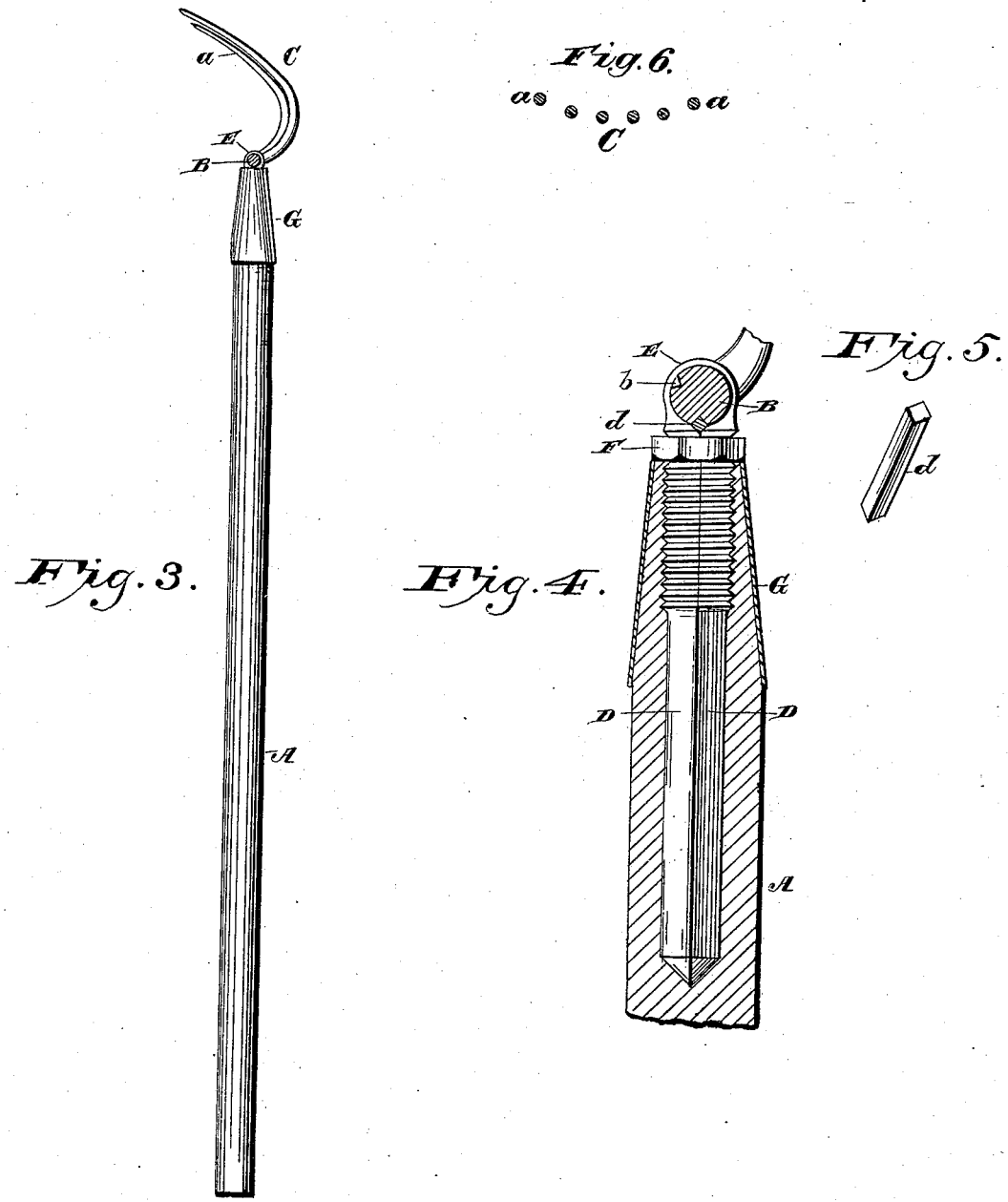

UNITED STATES PATENT OFFICE.

WILLIAM O. NOYES, OF DERRY, NEW HAMPSHIRE.

STONE AND POTATO FORK.

SPECIFICATION forming part of Letters Patent No. 310,958, dated January 20, 1885.

Application filed June 16, 1883. (No model.)

*To all whom it may concern:*

Be it known that I, WILLIAM O. NOYES, a citizen of the United States, residing in Derry, in the county of Rockingham, in the State of New Hampshire, have invented certain new and useful Improvements in Stone and Potato Forks, of which the following is a specification.

It is the object of my invention to provide an implement especially adapted for use upon land where the presence of stones interferes with or prevents the cultivation of the soil, whereby stones of any ordinary size may be gathered and loaded upon a suitable vehicle easily and quickly and with much less labor and fatigue than the same work can be done by hand without the aid of such a device.

To this end, therefore, my invention consists in a group of tines assembled upon a head, each tine being curved backward and thence sharply forward, the end tines being raised somewhat above the intermediate tines, giving thereby a "spooning" arrangement upon their concave faces, which facilitates the picking and loading of the stones.

My invention further consists in a series of curved tines arranged upon a transverse head, the latter being held by a loop upon a split shank set in the end of a handle, grooves being formed longitudinally in the head to receive a spline, which engages with a notch in the throat of the loop, the upper portion of the shank being threaded to receive a compressing-nut, whereby the tines may be adjusted at different angles with the handle, thus enabling the implement to be used as a rake, and permitting, also, the removal of the head and the substitution of a new one in case of breakage.

Figure 1:
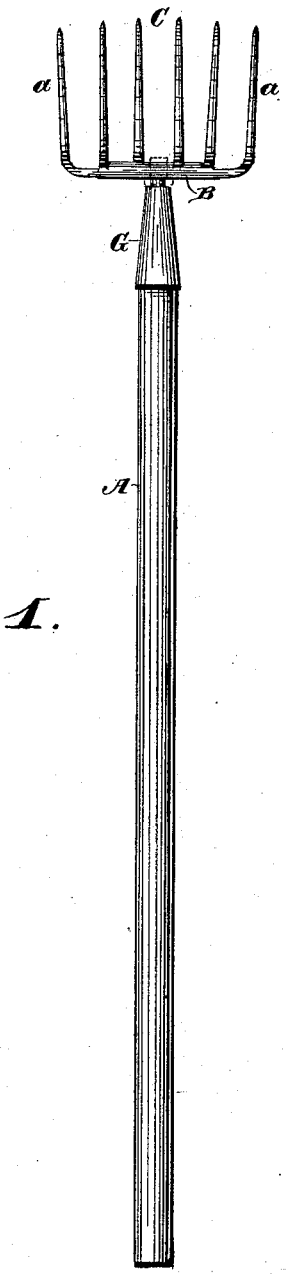
Figure 2:
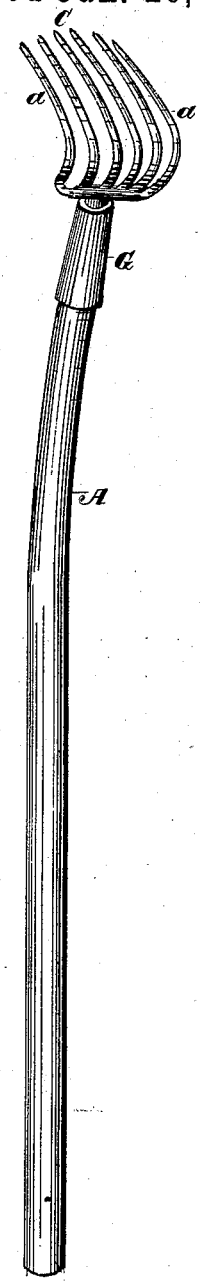

Referring to the drawings, forming part of this application, Figure 1 is a rear elevation illustrating the first part of my invention. Fig. 2 is a perspective view. Fig. 3 is a side elevation. Fig. 4 is a central longitudinal section enlarged, showing the adjustable shank set in the end of the handle with the cylindrical slotted head grasped by the loop of the shank and held in place by the removable spline, a portion only of the tines and handle being shown in this figure. Fig. 5 is a perspective view of the removable spline considerably enlarged for the purpose of illustration. Fig. 6 is a transverse section taken through the tines just above the point of their curvature.

A in said drawings indicates the handle of the stone-picker, which may be made of wood, and about four to five feet in length. I prefer to give a gentle curve to this handle, as shown in Fig. 2, whereby the head of the device is thrown slightly toward the rear. To the end of the handle is attached, in the manner hereinafter described, the head B, having tines C, which may be made of steel, and should have a spring temper. The number of tines, as well as the distance between them, may be varied within certain limits; but I have found that for the purposes of this invention six tines arranged at equal intervals, with a space of six and one-half inches between the outside tines, will answer every requirement. The tines C are bent or projected backward from the point where they unite with the head B, and are then curved somewhat sharply forward, substantially as shown in the side elevation, Fig. 3. By this construction the tines are arranged at such an angle to the handle as to adapt the implement to the several purposes hereinafter set forth.

It will be seen by reference to Fig. 1 of the drawings that the tines are not of equal length, the outer tines, *a*, being the shorter, while the intermediate ones are the longer, so that a line drawn through their points would be a gentle curve. The two outer tines, *a a*, take their forward curve at a point somewhat nearer to the head B than the others, and have, moreover, a somewhat less rearward projection. By this construction they lie somewhat forward of the four inner tines, and form with the latter a concave or spooning surface, whereby substances raised upon the tines will not be likely to roll off at the side. The construction mentioned is shown in Fig. 3, part of the head B, with its tines, being removed in order to show the two remaining intermediate tines, with the end tine, *a*, beyond. The head B, upon which the tines are arranged, is made cylindrical in cross-section, as shown in Fig. 4, and it is adjustably secured to the handle A in the following manner:

In Fig. 4, in which the parts are illustrated a little less than full size, D represents a shank having a loop, E, at one end, said shank being constructed in one piece of metal and the loop formed by bending the ends D D together until they meet, as shown in the figure. When lapped together, as shown, a cross-section of the lower portion of the shank would show it to be rectangular; but for about one-third of its length beneath the loop E it is made cylindrical and threaded to receive a nut, F. This shank, which may be rolled, forged, or struck out by dies, is then bent from a straight piece until the ends D D are nearly parallel, and the loop E is then given sufficient temper to permit the parts being sprung together to receive the nut.

In the cylindrical head B are formed two triangular slots cut longitudinally therewith, one lying in a vertical plane passing through the axis of the head B when the latter is in proper position upon the handle, and the other slot, b, upon the front portion of the head, the two being separated by fifty or sixty degrees of arc or thereabout. These slots are intended to receive a spline, d, which lies partly within the slot and partly in a recess or notch in the collar E, formed by cutting away a portion of the metal at the point where the collar opens—that is, in the throat of the loop. By turning the nut F down upon the threaded portion of the shank the two parts will spring apart sufficiently to permit the introduction or removal of this spline. The collar or loop E surrounds the cylindrical head B at its central point, its position being indicated by dotted lines in Fig. 1, in which the parts are shown upon too small a scale to permit its convenient illustration. The collar may be bent around the head, or, by giving it a sufficient temper, the latter may be introduced by removing the nut F, separating the ends D D, and slipping the head between them. When in position with the spline d inserted and the nut F turned up closely, the collar E will be drawn tightly around the head B and the spline d will be crowded firmly into the groove in the head and the notch in the collar, thereby securely preventing any turning or shifting of the head under any strain to which it may be subjected. By simply turning the nut, thereby allowing the collar to open slightly, the spline may be removed, the head B may be rotated, throwing the tines forward, and the spline being placed in the second groove or slot, b, the parts may be fastened in such position. In this manner, and by the means described, I am enabled to set the tines C at different angles with the handle A, and thus the implement is adapted to be used for different purposes. The shank D is set in the end of the handle and fastened in place in any suitable manner.

The manner of using my invention is as follows: The handle A is held in the hands as a fork is held, and by turning the concave faces of the tines toward the person the ends may be used to draw together the scattered rocks. When gathered, the implement may be turned over, the tines C pushed under the stones, which are raised and thrown into a cart, or wherever it may be desired to place them. By adjusting the head B in the collar of the shank, the device may be used as a rake and is adapted to any of the ordinary purposes for which a rake may be employed. Moreover, the length of the tines renders the implement especially useful as a potato-digger, and for similar purposes.

It is well known that in certain parts of the country many thousands of acres of land are unfit for cultivation because of the presence of multitudes of small and medium-sized stones, which lie scattered over the surface. The labor of picking up and loading these stones by hand, as it requires constant stooping and rising, is exceedingly laborious, and it is the purpose of my invention to lighten and expedite this work by providing a strong, cheap, and convenient implement whereby the stones may be easily gathered, raised, and loaded, and which may also be used for other farm-work, such as digging potatoes, raking, and similar purposes.

I am aware that prior to my invention fish-spears and other implements have been constructed having their prongs mounted upon a cross-head, which is adjustable in such manner as to place the prongs at different angles to the handle, and I make no claim, broadly, to such an invention.

Having thus fully described my invention, what I claim, and desire to secure by Letters Patent of the United States, is—

1. As a new article of manufacture, a stone and potato fork consisting of a handle having at one end a head provided with tines set closely together and curved backward and then sharply forward, forming an angle with the fork-handle, the outer tines being raised somewhat above the intermediate tines, substantially as and for the purpose set forth.

2. The combination, in a stone and potato fork, of a transverse head provided with tines constructed as described, a collar surrounding the central portion of said head, a split shank formed of the same metal with the collar and having a threaded end, and a nut running upon the latter, whereby the collar is drawn closely around the head, substantially as and for the purpose described.

3. The adjustable shank D, formed in a single piece, bent in the middle to encircle the picker-head, and having its extremities brought together, forming a lower rectangular portion and an upper cylindrical and threaded portion adapted to receive a compressing-nut, substantially as and for the purpose set forth.

4. The combination, with a transverse cylindrical head provided with curved tines and having longitudinal triangular slots formed therein at suitable intervals, of a split shank formed in a single piece, bent in the middle to embrace the slotted head, and having its ends brought together to receive a nut which turns upon its upper and threaded portion, a notch being formed in the throat of the encircling-loop to register with one of the notches or slots in the cross-head and receive a rectangular spline, whereby the tines may be adjusted at different angles with the handle, substantially as and for the purpose set forth.

5. The combination, with the cross-head B, provided with tines C, and having slots *b*, of the split shank D D, having a loop, E, encircling the head, with a notch formed in the throat of said loop, a spline, *d*, and nut F, turning upon the cylindrical threaded portion of the shank, substantially as and for the purpose set forth.

6. The implement herein described, consisting of the handle A, the head B, provided with tines C, with outer tines, *a a*, constructed as described, and the adjustable split shank D, having a lower rectangular and an upper threaded portion, with a loop surrounding the head B, and a nut, F, the head being slotted at suitable intervals to receive a spline, *d*, which rests partly in the slot and partly in a a notch in the throat of the loop E, substantially as and for the purposes set forth.

In testimony whereof I have signed my name to this specification in the presence of two subscribing witnesses.

WILLIAM O. NOYES.

Witnesses:
 S. HOWARD BELL,
 CHARLES BARTLETT.